(12) United States Patent
Jingle et al.

(10) Patent No.: US 11,062,534 B2
(45) Date of Patent: Jul. 13, 2021

(54) REMOTE AUTOMOTIVE DIAGNOSTICS

(71) Applicant: REPAIRIFY, INC., Plano, TX (US)

(72) Inventors: Curt Jingle, Jacksonville, FL (US); Frank Terlep, Richardson, TX (US)

(73) Assignee: REPAIRIFY, INC., Plano, TX (US)

( * ) Notice: Subject to any disclaimer, the term of this patent is extended or adjusted under 35 U.S.C. 154(b) by 301 days.

(21) Appl. No.: 16/202,642

(22) Filed: Nov. 28, 2018

(65) Prior Publication Data
US 2020/0168009 A1 May 28, 2020

(51) Int. Cl.
| | |
|---|---|
| G01M 17/00 | (2006.01) |
| G06F 7/00 | (2006.01) |
| G06F 11/30 | (2006.01) |
| G06F 19/00 | (2018.01) |
| G07C 5/00 | (2006.01) |
| G07C 5/08 | (2006.01) |
| G06K 9/46 | (2006.01) |

(52) U.S. Cl.
CPC ............. *G07C 5/0808* (2013.01); *G06K 9/46* (2013.01); *G07C 5/008* (2013.01); *G06K 2209/01* (2013.01)

(58) Field of Classification Search
CPC ........ G07C 5/0808; G07C 5/008; G06K 9/46; G06K 2209/01
USPC ................................................ 701/29.6, 31.4
See application file for complete search history.

(56) References Cited

U.S. PATENT DOCUMENTS

| | | | |
|---|---|---|---|
| 5,491,418 A | 2/1996 | Alfaro et al. | |
| 6,677,854 B2 | 1/2004 | Dix | |
| 6,728,603 B2 | 4/2004 | Pruzan et al. | |
| 7,584,030 B1 | 9/2009 | Graham | |
| 2006/0122748 A1 | 6/2006 | Nou | |
| 2007/0135981 A1 | 6/2007 | Raichle et al. | |
| 2007/0198147 A1 | 8/2007 | Keith et al. | |
| 2008/0071439 A1* | 3/2008 | Bertosa ............... | G07C 5/0808 701/32.7 |
| 2008/0161989 A1 | 7/2008 | Breed | |
| 2008/0177438 A1 | 7/2008 | Chen et al. | |

(Continued)

FOREIGN PATENT DOCUMENTS

| | | |
|---|---|---|
| EP | 2031822 A2 | 3/2009 |
| WO | 2007/027988 A2 | 3/2007 |
| WO | 2009/152201 A1 | 12/2009 |

OTHER PUBLICATIONS

Extended European Search Report issued in EP11851089.0 dated Mar. 3, 2017 (8 pages).

(Continued)

*Primary Examiner* — Mahmoud S Ismail
(74) *Attorney, Agent, or Firm* — Pranger Law PC; Arthur A. Wellman; Matthew Flinders

(57) ABSTRACT

Method and apparatus for remote diagnostics of automobiles are disclosed. In one embodiment, a method may include the steps of reading, by a mobile device, a vehicle identification number (VIN) from a vehicle, transmitting, by the mobile device, the VIN to a diagnostic database, receiving, by the mobile device, an indication that an original equipment manufacturer (OEM) diagnostic tool is required for a diagnosis of the vehicle, and selecting the OEM diagnostic tool for the diagnosis of the vehicle in response to the indication that an OEM diagnostic tool is required for the diagnosis of the vehicle.

14 Claims, 2 Drawing Sheets

(56) References Cited

U.S. PATENT DOCUMENTS

| | | | | |
|---|---|---|---|---|
| 2009/0112397 | A1* | 4/2009 | Roberts | G07C 5/008 701/33.4 |
| 2009/0326757 | A1 | 12/2009 | Andreasen et al. | |
| 2010/0042288 | A1 | 2/2010 | Lipscomb et al. | |
| 2011/0246018 | A1* | 10/2011 | Bertosa | G05B 19/0428 701/29.6 |
| 2015/0094903 | A1* | 4/2015 | Bell | G07C 5/0808 701/31.4 |
| 2016/0171599 | A1* | 6/2016 | Bray | G06Q 30/08 705/26.3 |
| 2016/0335816 | A1* | 11/2016 | Thoppae | H04L 67/42 |
| 2017/0301154 | A1* | 10/2017 | Rozint | G06Q 10/20 |

OTHER PUBLICATIONS

Observations by third parties filed Jul. 18, 2019 in EP11851089.0 (11 pages).

Gruhler et al., "Teleservice of CAN Systems via Internet", Proceedings of the International CAN Conference (ICC), Torino, Italy 1999 (8 pages).

Gruhler et al., "Teleservice of CAN Systems via Internet", retreived from https://www.semanticscholar.org/paper/Teleservice-of-CAN-Systems-via_Internet-Gruhler-Nusser/026507f90ce7401ab194ab110168301bea0fcfab on Jul. 18, 2019 (7 pages).

6th International CAN Conference, Proceedings, Table of Contents, 1999 (3 pages).

Observations by third parties filed Dec. 4, 2020 in EP11851089.0 (11 pages).

Observations by third parties filed Jan. 26, 2021 in EP11851089.0 (11 pages).

Bayilmis et al., "Implementation of a CAN/IEEE 802.IIb WLAN/CAN internet working system using a wireless interface unit", CAN in Automation, 2006 (5 pages).

CAN in Automation (Cia)—The International CAN Conference (iCC), retrieved from https://www.can-cia.org/ru/services/conferences/icc/, Jan. 26, 2021 (7 pages).

"IEEE Standards fro Local and Metropolitan Area Networks: Overview and Architecture", Technical Committee on Computer Communications of the IEEE Computer Society, 1990 (31 pages).

Ekiz et al., "Design and Implementation of a CAN/Ethernet Bridge", 1996 (10 pages).

International Search Report issued in PCT/US2011/065049 dated Apr. 5, 2012 (2 pages).

Written Opinion issued in PCT/US2011/065049 dated Apr. 5, 2012 (8 pages).

International Preliminary Report on Patentability issued in PCT/US2011/065049 dated Apr. 5, 2012 (9 pages).

* cited by examiner

REMOTE AUTOMOTIVE DIAGNOSTICS

BACKGROUND OF THE INVENTION

1. Field of the Invention

The present disclosure relates generally to automotive diagnostics, and more particularly, to remote automotive diagnostics using diagnostic tools.

2. Description of the Related Art

Diagnostics of vehicles have been performed by automotive repair shops. Repair shops may perform a conventional diagnosis of a vehicle by referring to a manual associated with the year, make and model, and in some instances, submodel, of the vehicle. Some mechanics may perform vehicle diagnosis based on experience or memory. Conventional methods of automotive diagnosis may be inefficient and prone to human error.

These and other deficiencies exist.

SUMMARY OF THE INVENTION

Method and apparatus for remote diagnostics of automobiles are disclosed. In one embodiment, a method may include the steps of: reading, by a mobile device, a vehicle identification number (VIN) from a vehicle; transmitting, by the mobile device, the VIN to a diagnostic database; receiving, by the mobile device, an indication that an original equipment manufacturer (OEM) diagnostic tool is required for a diagnosis of the vehicle; and selecting the OEM diagnostic tool for the diagnosis of the vehicle in response to the indication that an OEM diagnostic tool is required for the diagnosis of the vehicle.

In one embodiment, the method may further include the step of receiving, by the mobile device, an indication that an OEM diagnostic tool is not required for a diagnosis of the vehicle.

In one embodiment, the method may further include the step of selecting a non-OEM diagnostic tool for the diagnosis of the vehicle in response to the indication that an OEM diagnostic tool is not required for the diagnosis of the vehicle.

In one embodiment, the mobile device may comprise a camera.

In one embodiment, the step of reading the VIN from the vehicle may comprise the step of capturing, by the camera, an image of the VIN.

In one embodiment, the step of reading the VIN from the vehicle may further comprise the step of recognizing the VIN by optical character recognition (OCR).

In one embodiment, the step of reading the VIN from the vehicle may comprise the step of reading, by the camera, a VIN bar code.

In one embodiment, the step of reading the VIN from the vehicle may further comprise the step of decoding the VIN bar code.

In one embodiment, an apparatus may include: a vehicle identification number (VIN) reader configured to read a vehicle identification number (VIN) from a vehicle; a memory; and a processor coupled to the VIN reader and the memory, the processor configured to: transmitting the VIN to a diagnostic database; receive an indication that an original equipment manufacturer (OEM) diagnostic tool is required for a diagnosis of the vehicle; and select the OEM diagnostic tool for the diagnosis of the vehicle in response to the indication that an OEM diagnostic tool is required for the diagnosis of the vehicle.

In one embodiment, the processor may be further configured to receive an indication that an OEM diagnostic tool is not required for a diagnosis of the vehicle.

In one embodiment, the processor may be further configured to select a non-OEM diagnostic tool for the diagnosis of the vehicle in response to the indication that an OEM diagnostic tool is not required for the diagnosis of the vehicle.

In one embodiment, the VIN reader may comprise a camera.

In one embodiment, the camera may be configured to capture an image of the VIN.

In one embodiment, the processor may be further configured to recognize the VIN by optical character recognition (OCR).

In one embodiment, the camera may be configured to read a VIN bar code.

In one embodiment, the processor may be further configured to decode the VIN bar code.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The following descriptions provide different configurations and features according to exemplary embodiments. While certain nomenclature and types of devices/hardware are described, other names and devices/hardware usage is possible and the nomenclature provided is done so by way of non-limiting examples only. Further, while particular embodiments are described, it should be appreciated that the features and functions of each embodiment may be combined in any manner within the capability of one of ordinary skill in the art. The figures provide additional exemplary details regarding the present invention. It should also be appreciated that these exemplary embodiments are provided as non-limiting examples only.

Figure 1:
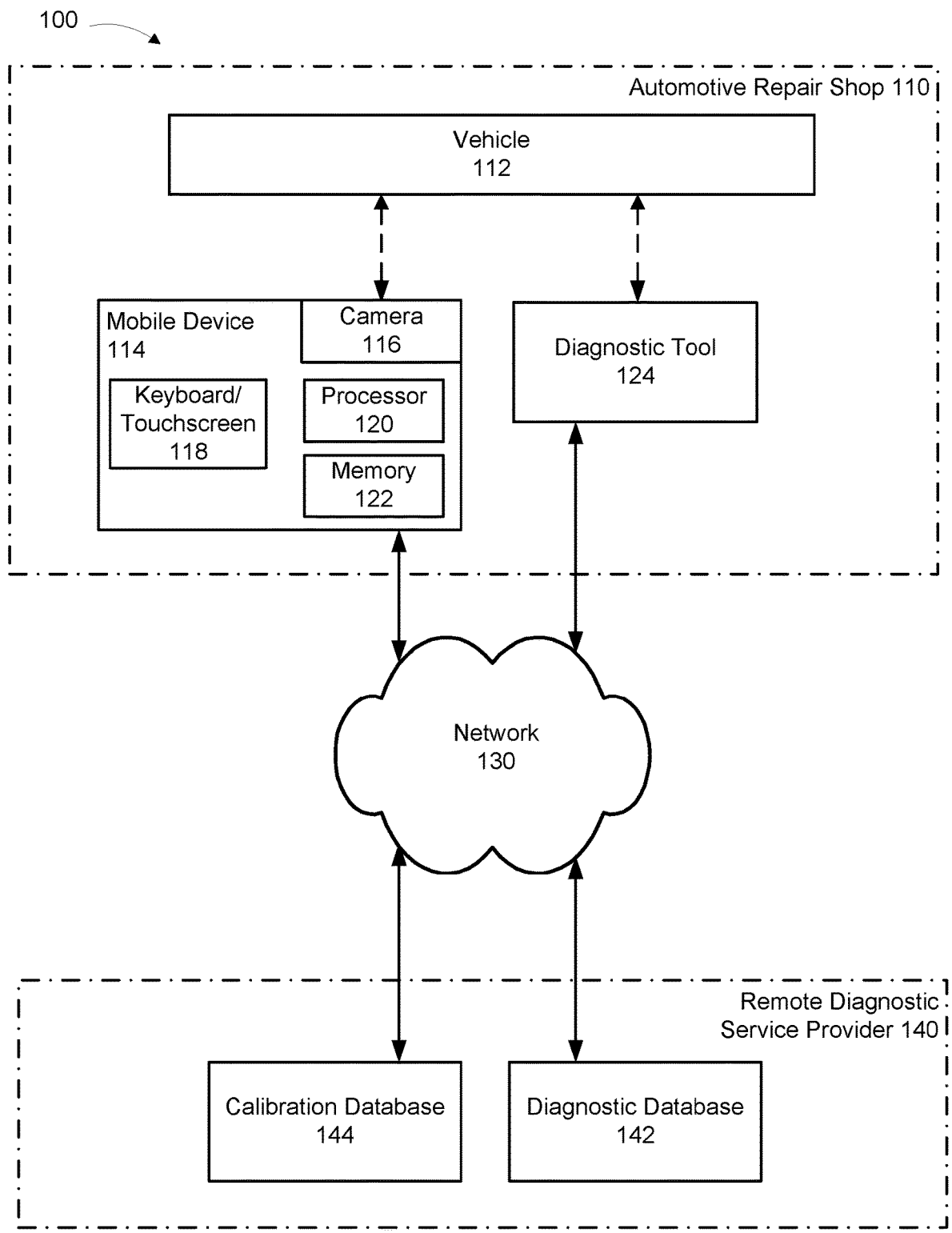
FIG. 1 depicts a block diagram of a system according to one embodiment.
Figure 2:
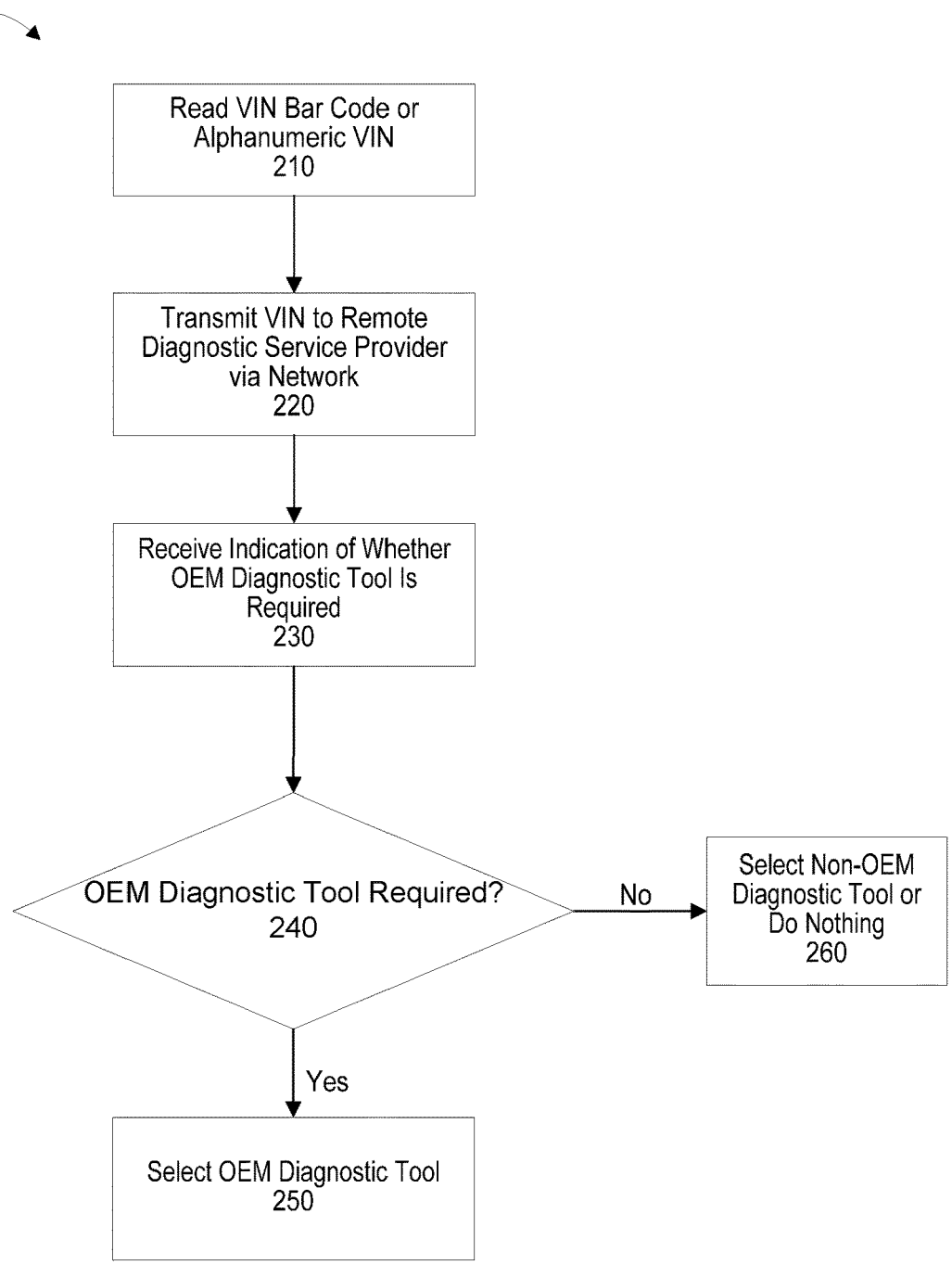
FIG. 2 depicts a flowchart of process steps according to one embodiment.

Several embodiments of the present invention and their advantages may be understood by referring to FIGS. 1-2.

FIG. 1 depicts a block diagram of system 100 according to one embodiment. In one embodiment, automotive repair shop 110 may communicate with remote diagnostic service provider 140 via network 130. Automotive repair shop 110 may be a dealer repair shop or an independent repair shop. In one embodiment, vehicle 112 may be located at automotive repair shop 110 for diagnosis. A vehicle identification number (VIN) or VIN bar code may be affixed to vehicle 112, for example, behind windshield or inside driver's door of vehicle 112.

In one embodiment, mobile device 114 may be provided to read the VIN or VIN bar code on vehicle 112. Mobile device 114 may be a cellular telephone, a tablet or another type of wireless device. In one embodiment, mobile device 114 may include camera 116, keyboard or touchscreen 118, processor 120, and memory 122.

In one embodiment, camera 116 of mobile device 114 may be configured to read the VIN bar code from vehicle 112. In one embodiment, the VIN bar code may be decoded to identify the VIN at a server, for example, a server at remote diagnostic service provider 140.

In another embodiment, camera 116 of mobile device 114 may be configured to read the VIN by capturing an image of the alphanumeric text of the VIN on vehicle 112. In one embodiment, processor 120 of mobile device 114 may be configured to recognize the alphanumeric text of the VIN by optical character recognition (OCR). In one embodiment, VIN may be entered manually by using keyboard or touchscreen 118 of mobile device 114 if the VIN or VIN bar code on vehicle 112 is illegible, or if camera 116 is otherwise unable to read the VIN or VIN bar code on vehicle 112.

Mobile device 114 may be configured to communicate with diagnostic database 142 and calibration database 144 at remote diagnostic service provider 140 via network 130. In one embodiment, diagnostic database 142 may be part of a cloud based server. In one embodiment, calibration database 144 also may be part of a cloud based server. In one embodiment, network 130 may be a wireless or cellular network. In one embodiment, communications between automotive repair shop 110 and remote diagnostic service provider 140 may be accomplished via the Internet, an intranet, a private network, or the like.

In one embodiment, diagnostic tool 124 may be provided at automotive repair shop 110 for diagnosis of vehicle 112. In one embodiment, diagnostic tool 116 may be an OEM diagnostic tool, for example, an OEM diagnostic tool provided by remote diagnostic service provider 140, or a non-OEM diagnostic tool, such as a generic or third-party diagnostic tool used by automotive repair shop 110.

In one embodiment, diagnostic tool 124 may be connected to a data bus on vehicle 112 to perform a vehicle diagnosis. In one embodiment, diagnostic tool 124 may be a digital diagnostic tool that is configured to be connected to a data bus on vehicle 112 to perform an automated diagnostic scan of vehicle 112. The diagnostic tool that is selected for vehicle diagnosis may be an OEM or non-OEM diagnostic tool based on an indication as to whether an OEM diagnostic tool is required or optional. In one embodiment, diagnostic tool 124 may be configured to communicate with remote diagnostic service provider 140 via network 130.

In one embodiment, a determination as to whether an OEM diagnostic tool is required or optional for a diagnosis of vehicle 112 may be made by retrieving diagnostic information from diagnostic database 142 based on the VIN of vehicle 112. In one embodiment, the year, make, model, and in some instances, submodel of vehicle 112 may be determined based on the VIN. Vehicles of certain years, makes, models and/or submodels may require OEM diagnostic tools, whereas other vehicles may be diagnosed by using non-OEM diagnostic tools, such as generic or third-party diagnostic tools.

A determination of whether a certain vehicle requires an OEM diagnostic tool may be made based on the year, make, model and/or submodel associated with the VIN of vehicle 112, by using information stored in diagnostic database 142, for example.

In one embodiment, an indication that an OEM diagnostic tool is required for a diagnosis of vehicle 112 may be received by mobile device 114 from remote diagnostic service provider 140 via network 130 based on the VIN of vehicle 112. In one embodiment, the indication that an OEM diagnostic tool is required may be displayed on a diagnostic application on mobile device 114.

In another embodiment, an indication that an OEM diagnostic tool is not required for a diagnosis of vehicle 112 may be received by mobile device 114 if a determination is made that vehicle 112 does not require an OEM diagnostic tool based on the VIN. In one embodiment, the indication that an OEM diagnostic tool is not required may also be displayed on the diagnostic application on mobile device 114.

In one embodiment, the diagnostic application on mobile device 114 may perform various additional functions, for example, allowing automotive repair shop 110 to schedule an appointment for the diagnosis, or provide graphic displays of various functionalities of vehicle diagnosis.

FIG. 2 depicts a flowchart 200 of process steps according to one embodiment. In one embodiment, a VIN bar code or alphanumeric VIN may be read as shown in block 210, by mobile device 114 of FIG. 1, for example.

Referring to FIG. 2, in one embodiment, after the VIN bar code or alphanumeric VIN is read in block 210, the VIN may be transmitted to a remote diagnostic service provider via a network, as shown in block 220. In one embodiment, the VIN of vehicle 112 in FIG. 1 may be transmitted to remote diagnostic service provider 140 via network 130, which may identify the year, make, model, and/or submodel of vehicle 112 based on the VIN, and generate an indication of whether an OEM diagnostic tool is required for vehicle 112 by using diagnostic database 142 in FIG. 1, for example.

In one embodiment, after the year, make, model, and/or submodel of vehicle 112 are identified, an indication of whether an OEM diagnostic tool is required or optional may be generated by remote diagnostic service provider 140 and transmitted to mobile device 114 via network 130. In one embodiment, mobile device 114 may receive an indication of whether an OEM diagnostic tool is required, as shown in block 230 of FIG. 2. If an OEM diagnostic tool is required in block 240, then the OEM diagnostic tool is selected in block 250 of FIG. 2.

In one embodiment, automotive repair shop 110 in FIG. 1 may perform additional tasks on a diagnostic application of mobile device 114, such as scheduling an appointment for the diagnosis of vehicle 112, or perform various other functions on the diagnostic application of mobile device 114.

In one embodiment, if mobile device 114 receives an indication that an OEM diagnostic tool is not required, then automotive repair shop 110 may select a non-OEM diagnostic tool, such as a generic or third-party diagnostic tool, or do nothing, as shown in block 260 of FIG. 2.

Although multiple embodiments are disclosed, it should be recognized that these embodiments are not exclusive to one another, and features of one embodiment may be applied to the others as necessary and/or desired.

It will be appreciated by those skilled in the art that the various embodiments are not limited by what has been particularly shown and described hereinabove. Rather the scope of the various embodiments includes both combinations and sub-combinations of features described hereinabove and variations and modifications thereof which are not in the prior art. It should further be recognized that these various embodiments are not exclusive to each other.

It will be readily understood by those persons skilled in the art that the embodiments disclosed here are susceptible to broad utility and application.

Many embodiments and adaptations other than those herein described, as well as many variations, modifications and equivalent arrangements, will be apparent from or reasonably suggested by the various embodiments and foregoing description thereof, without departing from the substance or scope of the above description.

Accordingly, while the various embodiments have been described here in detail in relation to exemplary embodiments, it is to be understood that this disclosure is only illustrative and exemplary and is made to provide an enabling disclosure. Accordingly, the foregoing disclosure is not intended to be construed or to limit the various embodiments or otherwise to exclude any other such embodiments, adaptations, variations, modifications or equivalent arrangements.

What is claimed is:

1. A method for performing diagnostics of electronic vehicle systems, the method comprising the steps of:
reading, by a mobile device, a vehicle identification number (VIN) from a vehicle;
transmitting, from the mobile device over a computer network, the read VIN to a diagnostic database_system having records correlating VINs with diagnostic tool types compatible with a data bus system of the vehicle;
performing a lookup of the VIN in the database system;
based on the lookup, determining that a diagnostic tool type compatible with being connected to the data bus system of the vehicle is not required to be an original equipment manufacturer (OEM) diagnostic tool type and selecting a diagnostic tool type compatible with being connected to the data bus system of the vehicle;
in response to selecting the diagnostic tool type, performing at least one of:
presenting the selection of the diagnostic tool type from a computer user interface; or
establishing a connection between a selected diagnostics tool type and the vehicle through the vehicle data connector, performing a diagnosis of the vehicle using the connected diagnostic tool type, and presenting the diagnosis of the vehicle from a computer user interface.

2. The method of claim 1 wherein the selecting of a diagnostic tool type comprises selecting a non-OEM diagnostic tool type in response to the determining that a diagnostic tool type is not required to be an original equipment manufacturer (OEM) diagnostic tool type.

3. The method of claim 1, wherein the mobile device comprises a camera.

4. The method of claim 3, wherein the step of reading the VIN from the vehicle comprises the step of capturing, by the camera, an image of the VIN.

5. The method of claim 4, wherein the step of reading the VIN from the vehicle further comprises the step of recognizing the VIN by optical character recognition (OCR).

6. The method of claim 3, wherein the step of reading the VIN from the vehicle comprises the step of reading, by the camera, a VIN bar code.

7. The method of claim 6, wherein the step of reading the VIN from the vehicle further comprises the step of decoding the VIN bar code.

8. An apparatus, comprising:
a diagnostic database system programmed and configured to correlate records of vehicle identification numbers (VINs) with diagnostic tool types compatible with a data bus system of vehicles identified by the VINs;
a vehicle identification number (VIN) reader configured to read a first vehicle identification number (VIN) from a vehicle;
a memory; and
a processor coupled to the VIN reader and the memory, the processor configured to:
transmit the first VIN over a computer network to the diagnostic database system;
cause the diagnostic database system to perform a lookup; which based on the lookup, determine that a diagnostic tool type compatible with being connected to the data bus system of the vehicle is not required to be an original equipment manufacturer (OEM) diagnostic tool type and select a diagnostic tool type compatible with being connected to the data bus system of the vehicle associated with the first VIN;
in response to the selection of a diagnostics tool type, perform at least one of:
presenting the selection of the diagnostic tool type in a display of the VIN reader; or
cause a diagnostic tool of the selected tool type to perform a diagnosis of the vehicle through a connection with the vehicle's vehicle data connector, and causing a computer user interface to display the diagnosis of the vehicle.

9. The apparatus of claim 8, wherein the selecting of a diagnostic tool type comprises selecting a non-OEM diagnostic tool type in response to the determining that a diagnostic tool type is not required to be an original equipment manufacturer (OEM) diagnostic tool type.

10. The apparatus of claim 8, wherein the VIN reader comprises a camera.

11. The apparatus of claim 10, wherein the camera is configured to capture an image of the VIN.

12. The apparatus of claim 11, wherein the processor is further configured to recognize the VIN by optical character recognition (OCR).

13. The apparatus of claim 10, wherein the camera is configured to read a VIN bar code.

14. The apparatus of claim 13, wherein the processor is further configured to decode the VIN bar code.

* * * * *